United States Patent

Jania

[15] 3,640,301
[45] Feb. 8, 1972

[54] HYDRAULIC POWER SUPPLY

[72] Inventor: Zbigniew J. Jania, Northville, Mich.
[73] Assignee: Ford Motor Company, Dearborn, Mich.
[22] Filed: June 15, 1970
[21] Appl. No.: 46,077

[52] U.S. Cl. ................................137/101, 60/52 B, 60/52 S
[51] Int. Cl. ..................G05d 11/03, F17d 3/00, F01b 25/02
[58] Field of Search ................137/101; 60/52 S, 52 B, 97 E; 91/412

[56] References Cited

UNITED STATES PATENTS

| | | | |
|---|---|---|---|
| 3,142,962 | 8/1964 | Lohbauer | ...............................60/52 S |
| 2,799,996 | 7/1957 | Van Meter | .......................60/52 S UX |
| 2,818,711 | 1/1958 | Lincoln et al. | ........................60/52 S X |

Primary Examiner—Robert G. Nilson
Attorney—John R. Faulkner and Robert W. Brown

[57] ABSTRACT

A common hydraulic power supply for a motor vehicle power-steering system and power brake system. The hydraulic power supply supplies hydraulic fluid from a power-steering pump continuously through a flow control valve to a power-steering system. The power brake system is supplied with hydraulic fluid from an accumulator as required. The accumulator is charged with hydraulic fluid by the power-steering pump. Accumulator charging occurs when the pressure in the accumulator falls below a predetermined value, and is accomplished by the diversion of a portion of the flow from the power steering pump to the power brake system. The diverted fluid passes through a pressure sensing valve, the flow control valve, a check valve, and into the accumulator.

6 Claims, 2 Drawing Figures

HYDRAULIC POWER SUPPLY

BACKGROUND OF THE INVENTION

This invention relates to a hydraulic power supply, and more particularly, to a common hydraulic power supply for a power-steering system and a power brake system.

It has been the practice for motor vehicle manufacturers equipping their products with power-steering systems and power brake systems to use a separate hydraulic power-steering pump to supply fluid pressure to a power-steering system and a separate source of power for the power brake system, usually in the form of a vacuum booster. Various proposals have been made in the past for combining the functions of these two power supply systems so that a single hydraulic power supply would furnish power for both the power-steering system and the power brake system of a motor vehicle. See, for example, U.S. Pat. No. 2,875,843, issued Mar. 3, 1959, to E. R. Price; and U.S. Pat. No. 3,119,235, issued Jan. 28, 1964, to R. L. Lewis and L. J. Larsen. These combined or common hydraulic power supply system proposals have been quite complex in design and, for this reason and others, have been rejected by motor vehicle manufacturers.

Recently, a considerable amount of research and development work has been done on the subject of skid control for motor vehicle brake systems. The object of a skid control brake system is to minimize the stopping distance for the motor vehicle, while at the same time retaining directional stability of the vehicle. Skid control is accomplished by effectively controlling the amount of wheel slip permitted, regardless of the pedal pressure applied to the brake by the operator of the motor vehicle, to thereby retain vehicle directional stability.

In a skid control system, it is desirable to have a source of power both for a power brake system designed to reduce brake pedal effort and for a skid control servo actuator to limit wheel slip and thereby provide skid control. Although it appears feasible to use a vacuum power booster, such as the kind presently employed for motor vehicle power brake systems, to supply the power necessary for the power brake system and skid control system, it appears to be preferable to use hydraulic power because this results in smaller and lighter actuator devices for the skid control and brake systems and also results in a more rapid response. Moreover, to simplify and reduce the cost of the power brake and skid control systems, it is desirable to use the hydraulic power-steering pump for the purpose of supplying hydraulic pressure for both the power-steering system and the power brake system equipped with skid control.

In power-steering systems of the type used on most motor vehicles so equipped, the hydraulic pump used to power the system is of the positive displacement type. Moreover, the power-steering system usually includes an open center valve to direct the hydraulic fluid in the steering system to the appropriate place to reduce the steering effort required. The power-steering pump supplies a continuous flow of hydraulic fluid through this power-steering valve and the remainder of the power-steering system, whereupon the fluid returns to a reservoir which supplies fluid to the power-steering pump, the system thus being a closed hydraulic system. The discharge pressure developed by the hydraulic power-steering pump is whatever is required to force the hydraulic fluid through the discharge piping, that is, the discharge pressure is determined by the load imposed by the power-steering system.

In the open center valve power-steering system, the discharge pressure of the hydraulic power-steering pump is normally very low because very little pressure is required to force the fluid through the discharge piping when the motor vehicle is traveling in a straight line. Thus, the power-steering system is basically a low-pressure system. On the other hand, the power brake system requires high pressure, in the range of 700 to 800 pounds per square inch (p.s.i.), and hydraulic power at such pressures is required only on an intermittent basis.

Because the power steering system is a low-pressure system and because the power brake system is a relatively high-pressure system, a common hydraulic power supply for both systems requires the use of an accumulator to store hydraulic fluid at the pressure levels required intermittently by the power brake system. An accumulator is, of course, a well-known device the function of which is to store fluid energy and to deliver the same as required. An accumulator is used in those situations where a directly connected pump would be unable to supply energy at the rate required by the system connected to the accumulator.

SUMMARY OF THE INVENTION

It may now be appreciated that in combining the power source for the power-steering system and the power brake system by using a positive displacement hydraulic pump for both functions, the power-steering system normally operating at low pressure and the power brake system at high pressure, it is necessary to provide means for charging an accumulator to a predetermined pressure level and also to provide means for recharging the accumulator when the pressure level falls below a predetermined level. Furthermore, it is very desirable that this charging and recharging of the accumulator for the power brake system be accomplished without completely disrupting the supply of fluid to the power steering system. The common hydraulic power supply of the invention performs the function of charging and recharging the accumulator, while at the same time supplying a continuous flow of hydraulic fluid to the power steering system so that it may continue to operate.

According to the invention, a common hydraulic power supply for a motor vehicle power steering system and power brake system includes a hydraulic pump of the positive displacement type, such as a power steering pump, and an accumulator for the storage of pressurized hydraulic fluid to supply a power brake system, the accumulator having a check valve in its supply line to prevent the escape of pressurized fluid therefrom. Means are provided for dividing the fluid output flow from the hydraulic power-steering pump between the accumulator and the power-steering system, the power-steering system being of the low-pressure open-center valve type and requiring a continuous flow of hydraulic fluid. With the apparatus of the invention, the entire hydraulic pump output flows through the power-steering system, except when the accumulator supplying the power brake system is in need of being recharged, that is, when the accumulator pressure has fallen below a predetermined value. When this occurs, a pressure-sensing valve is actuated to permit flow from the fluid flow dividing means in two directions or streams, a stream of fluid for the power-steering system flowing in one direction and a stream to recharge the accumulator flowing in another direction. The proportion of the fluid output from the hydraulic power-steering pump that flows to the accumulator to recharge it is determined by a flow control valve, which proportions the flow between the power-steering system and the accumulator.

It is, therefore, an object of the present invention to provide a common hydraulic power supply for a first hydraulic system normally operating at low pressure and requiring continuous flow and for a second hydraulic system requiring relatively high hydraulic pressure and operating intermittently.

Another object of the invention is to provide a common hydraulic power supply for a power-steering system and a power brake system, particularly a brake system equipped with skid control.

Another object of the invention is to provide a common hydraulic power supply for a power-steering system normally operating at low pressure and requiring continuous flow and for a power brake system requiring relatively high hydraulic pressure and operating intermittently.

A further object of the invention is to provide means for supplying power to the high-pressure power brake system without disrupting the supply of fluid power to the power-steering system.

A still further object of the invention is to provide means for supplying power to the power brake system regardless of the load requirements of the power-steering system.

These and other objects of the invention may be better understood by reference to the description which follows and to the drawings.

DESCRIPTION OF THE PREFERRED EMBODIMENT

Figure 1:
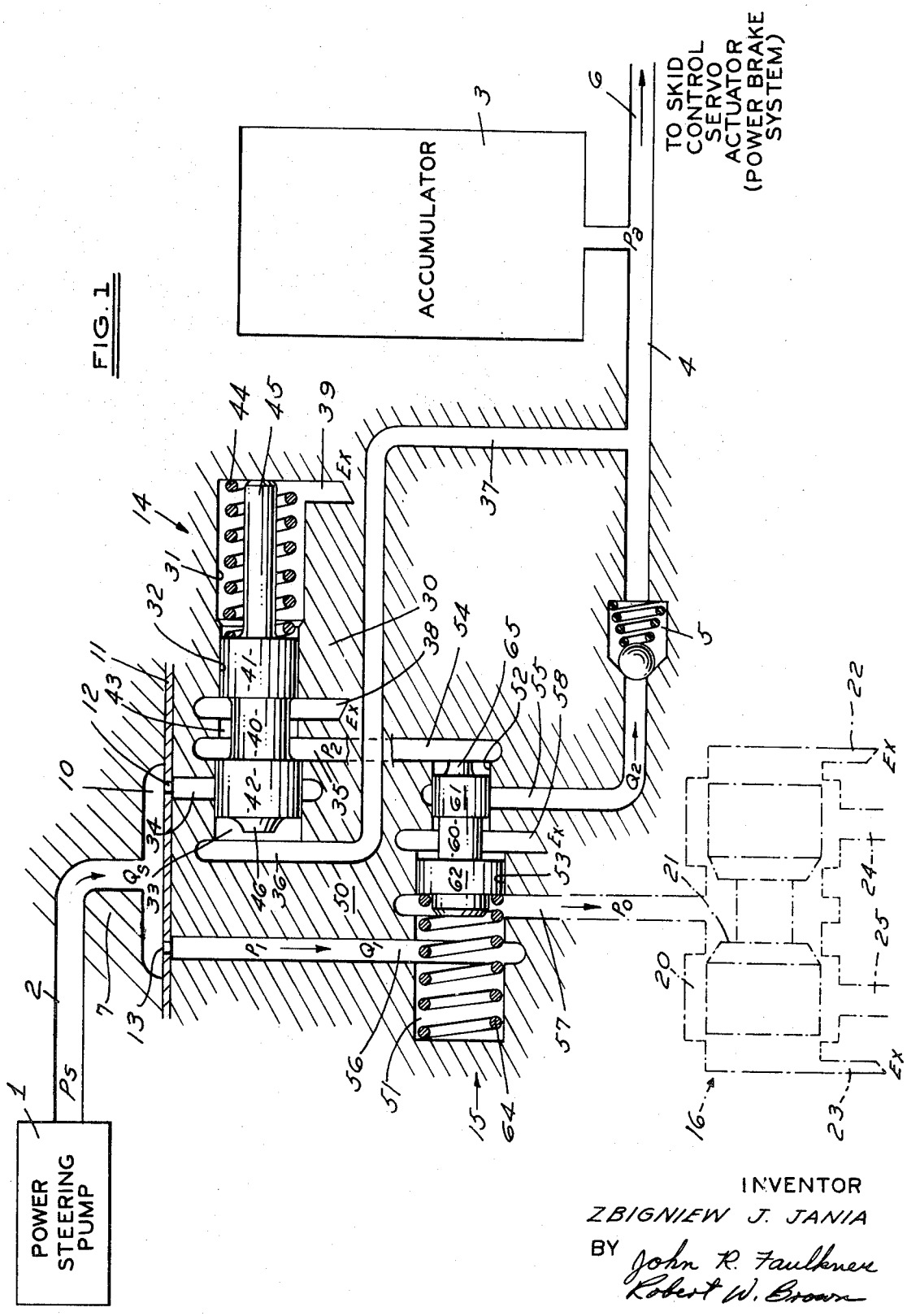
FIG. 1 is a schematic diagram of the preferred embodiment of the invention.

FIG. 1 depicts the preferred embodiment for a common hydraulic power supply for a power-steering system and power brake system of a motor vehicle, and particularly, for a motor vehicle brake system equipped with skid control.

Connected to a hydraulic power steering pump 1 of the positive displacement type is an output line 2. An accumulator 3 is used to store hydraulic fluid under relatively high pressure for intermittent use by a power brake system (not shown). The accumulator is equipped with a supply line 4 and a check valve 5 therein to prevent the escape of pressurized fluid from the accumulator. Fluid energy stored by the accumulator is supplied to a power brake system, and to a skid control servo actuator in the power brake system if it is so equipped, through a hydraulic line 6.

Fluid flow dividing means, shown generally at 7, is connected to output line 2 from power-steering pump 1. Fluid flow dividing means 7 has a chamber 10 and an orifice plate 11 within the chamber 10. Orifice plate 11 has a first orifice 12 therein and a second orifice 13 connected in parallel with first orifice 12 so that flow from output line 2 may be variably divided between first orifice 12 and second orifice 13.

The preferred embodiment of the common hydraulic power supply includes a pressure-sensing valve, shown generally at 14, and a flow control valve, shown generally at 15. In operation, fluid flow continuously from output line 2 through orifice 13 in fluid flow dividing means 7, through flow control valve 15, and into an open-center power-steering valve, such as that shown in phantom at 16.

The operation of open-center power-steering valves is well understood in the art. The valve consists of a valve body 20 having an opening in which a valve spool 21 is movably mounted. The valve body also has exhaust ports 22 and 23 at the extreme ends of the valve body opening. When the motor vehicle steering mechanism (not shown) is adjusted for vehicle motion in a straight line, the valve spool 21 is located centrally within the valve body opening and hydraulic fluid flows continuously into the open-center portion of the valve spool and out the exhaust ports 22 and 23 where it is returned to the power-steering pump reservoir (not shown). When the steering mechanism of the vehicle is adjusted to direct the vehicle either to the right or to the left, the power-steering valve spool 21 also moves either to the right or to the left to block the fluid from entering into the exhaust ports 22 and 23 and to thereby result in a pressure increase in either hydraulic output line 24 or 25, depending upon the direction in which valve spool 21 is moved. This reduces the steering effort which the operator of the vehicle is required to expend. The foregoing description of the power-steering valve is given in order that a better understanding of the operation of the common hydraulic power supply, and especially of the pressure-sensing valve and flow control valve, may be obtained.

Pressure-sensing valve 14 comprises a valve body 30 having a generally cylindrical opening 31 therein; the generally cylindrical opening has a small diameter portion 32 and a larger diameter portion 33. Communicating with the large diameter portion 33 of the opening 31 in valve body 30 is an input port 34 connected to the first orifice 12 in the orifice plate 11 of fluid flow dividing means 7. Also communicating with this same area of opening 31 is an output port 35 and a pressure-sensing port 36 which is connected to means, such as hydraulic line 37 connected to supply line 4 of the accumulator, for supplying pressure at pressure-sensing port 36 corresponding to, or proportional to, the pressure in the accumulator. Valve body 30 is also provided with exhaust ports 38 and 39 communicating with opening 31. Mounted for axial movement within generally cylindrical opening 31 is open-center valve spool 40 having a small diameter portion 41 corresponding to the small diameter portion 32 of opening 31 and having a large diameter portion 42 corresponding to the large diameter portion 33 of opening 31. The small cylindrical portion 41 of valve spool 40 is separated from the large diameter portion 42 by an open-center space 43.

Resilient means in the form of spring 44 is used to urge valve spool 40 axially to the left as viewed in FIG. 1, and projections 45 and 46 on valve spool 40 are used to limit travel of the valve spool to the left and to the right.

Flow control valve 15 includes a valve body 50 having a generally cylindrical opening 51 therein, the opening having a smaller diameter portion 52 and a larger diameter portion 53. Communicating with the rightmost portion of opening 51, as viewed in FIG. 1, are both a first input port 54 connected to output port 35 of pressure-sensing valve 14 and a first output port 55 connected to the through side of check valve 5 in supply line 4 for accumulator 3. Also communicating with the central portion of opening 51 in flow control valve 15 is second input port 56 connected to second orifice 13 in orifice plate 11, and second output port 57 connected to power-steering valve 16. Mounted for axial movement within opening 51 is generally cylindrical valve spool 60. Valve spool 60 has a smaller diameter portion 61 corresponding to the smaller diameter portion 52 of valve body opening 51, and a larger diameter portion 62 corresponding to the larger diameter portion 53 of valve body opening 51. Valve spool 60 has an open-center region 63 separating the smaller diameter portion 61 and larger diameter portion 62, the open-center space permitting any leakage of hydraulic fluid into the region to escape through exhaust port 58. Although spool 60 is shown to have a small diameter portion 61 and a large diameter portion 62, these portions can be made identical in size, or portion 61 could be made larger in diameter than portion 62. If identical in size, then exhaust port 58 and open-center region 63 are not required because no differential area between portions of the spool would exist on which leakage fluid could act to produce an undesirable axial force. Resilient means in the form of spring 64 is provided to urge spool 60 axially toward the right as viewed in FIG. 1. Projection 65 provides means for limiting the travel of spool 60 toward the right.

DESCRIPTION OF THE OPERATION

The hydraulic power-steering pump 1 is of the positive displacement type and is assumed to be driven by the motor vehicle engine. This means that for a fixed engine speed, the amount of fluid displaced by the pump per unit of time is constant, that is, the volumetric flow rate $Q_s$ is constant regardless of the load pressure requirements, unless such pressure requirements cause a pressure relief valve integral with the pump to discharge a portion of the pump output directly into the pump reservoir. The common hydraulic power supply of the invention takes advantage of the fact that pump flow $Q_s$ is constant for a given engine speed.

The positions of pressure-sensing valve spool 40 and flow control valve spool 60 are shown in the drawing for the condition in which the accumulator 3 is fully charged to a first predetermined pressure level, for example, 800 p.s.i. Pressure-sensing valve spool 40 is urged to the right, against the force exerted by spring 44, by the pressure $P_a$ acting through pressure-sensing port 36 on the face of the larger diameter portion 42 of valve spool 40. In this position, exhaust port 35 is connected through open-center portion 43 of spool 40 to exhaust port 38. Spool 60 of flow control valve 15 is urged to the right by the force exerted on it by spring 64 to thereby block flow from first input port 54 through first output port 55, and to permit full flow $Q_s$ through second input port 56, through second output port 57, and into the power steering valve 16. The full pump flow $Q_s$ passes through second orifice 13 where a pressure drop occurs; there is no flow through first orifice 12 because flow is closed or blocked by the large diameter portion 42 of valve spool 40 and no fluid will flow into output port 35. Check valve 5 positively prevents the escape of fluid from accumulator 3 into the low-pressure side.

When, due to leakage or to operation of the power brake system, accumulator pressure $P_a$ decreases below a second predetermined value, for example, 700 p.s.i., it is desired to recharge the accumulator back to the first predetermined value, 800 p.s.i. SPring 44 of pressure-sensing valve 14 is chosen so that the force exerted by it on spool 40 urging spool 40 toward the left is equal to the force exerted by the second predetermined pressure $P_a$ (700 p.s.i.) acting through pressure-sensing port 36 on spool 40 urging it toward the right. Thus, when the pressure $P_a$ falls below the second predetermined value, 700 p.s.i., the force of spring 44 overcomes the pressure $P_a$ in the pressure-sensing port 36 and valve spool 40 starts to move toward the left, first closing exhaust port 38 and then opening input port 34 connected to the pump via first orifice 12. Hydraulic fluid then enters open-center region 43 of valve spool 40 and this produces an additional force tending to urge valve spool 40 to the left, this additional force being due to the fact that cylindrical portion 42 of valve spool 40 is larger in diameter than cylindrical portion 41; this causes valve spool 40 to snap all the way to the left to fully open the valve for flow from input port 34 through output port 35 and into first input port 54 of flow control valve 15. At this instant in time, $Q_1$, the flow rate through flow control valve 15 to the power-steering valve 16, is equal to $Q_s$, and $Q_2$, the flow rate through pressure-sensing valve 14 and flow control valve 15 to accumulator 3, is equal to zero. However, because flow $Q_2$ is equal to zero, the pressure $P_2$ in the first input port 54 to flow control valve 15 is equal to $P_s$, the pressure at the output of the power-steering pump. The pressure $P_1$ of the fluid entering the flow control valve 15 at second input port 56 is necessarily less than $P_s$ because a pressure drop occurs through second orifice 13 as a result of flow $Q_1$ therethrough. At this point, valve spool 60 will move toward the left if the forces urging spool 60 in that direction are greater than the forces urging spool 60 toward the right. The force urging spool 60 toward the left is that which is exerted as a result of pressure $P_2$, equal to pressure $P_s$, acting on the face of cylindrical portion 61 of spool 60 through input port 54. Spool 64 is urged to the right by the force exerted by lower pressure $P_1$ acting on the face of cylindrical portion 62 of spool 60 through second input port 56. The areas of the faces of cylindrical portions 61 and 62 and spring force 64 are chosen so that higher pressure $P_2$ is sufficient to move spool 60 slowly to the left. When this occurs, first output port 55 is opened to flow from first input port 54, and there is a flow down to the through side of check valve 5. If pressure $P_2$ is less than pressure $P_a$, then check valve 5 will remain closed and flow $Q_2$ will be zero resulting in pressure $P_2$ remaining greater than pressure $P_1$ and spool 60 will continue to move to the left partially obstructing flow from second input port 56 through second output port 57. This increases pressure $P_1$ and pressure $P_s$ because the output of hydraulic pump 1 is constant and greater pressure is required to force the fluid through the discharge piping. Because pressure $P_2$ is equal to pressure $P_s$, it too increases until such time that it exceeds accumulator pressure $P_a$. When this occurs, check valve 5 opens and hydraulic fluid flows into supply line 4 and into accumulator 3 at the flow rate $Q_2 = Q_s - Q_1$.

As the accumulator charges, accumulator pressure $P_a$ increases and acts through pressure-sensing port 36 on large diameter cylindrical portion 42 of valve spool 40 increasing the force urging it toward the right. When this force has increased to the point where it exceeds the forces due to spring 44 and pressure $P_2$ acting on the differential area between large diameter cylindrical portion 42 and small diameter cylindrical portion 41, spool 40 will then slowly move toward the right until inlet port 34 is closed. When this occurs, pressure $P_2$ suddenly decreases removing the force due to the differential areas urging spool 40 to the left; spool 40 suddenly snaps all the way to the right, and flow to accumulator 3 ceases. At this point in time, output port 35 of pressure-sensing valve 14, and first input port 54 and first output port 55 of flow control valve 15, are all connected to exhaust port 38. This causes the accumulator pressure $P_a$ to close check valve 5, and causes the force exerted by spring 64 and the force exerted by pressure $P_1$ acting on cylindrical portion 62 of spool 60, to move spool 60 to the right. The entire flow $Q_s$ from power-steering pump 1 is again directed to power-steering valve 16.

ADDITIONAL DESCRIPTION OF PREFERRED EMBODIMENT

Figure 2:
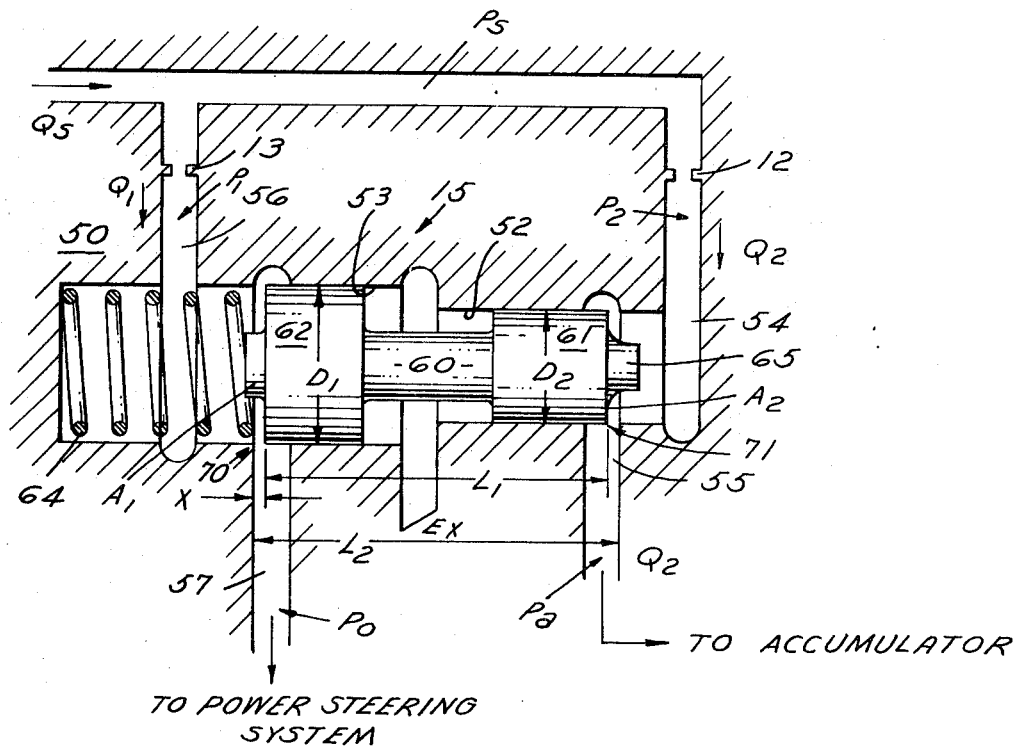
FIG. 2 is a more detailed schematic diagram of a portion of the apparatus illustrated in FIG. 1.

During charging of accumulator 3, volumetric flow rate $Q_s$ is divided into flow rate $Q_1$ and $Q_2$. The manner in which flow rate $Q_s$ is divided is determined by first orifice 12, second orifice 13, and flow control valve 15. FIG. 2 schematically illustrates the flows, pressures, and position for spool 60 of flow control valve 15 when it is regulating flow and accumulator 3 is being charged.

First orifice 12 and second orifice 13 preferably are made with sharp edges and large diameter-to-length ratios to make the operation of flow control valve 15 largely independent of temperature when used with a hydraulic fluid the density of which does not vary greatly within the temperature range normally encountered in motor vehicle operation. Flow through such orifices is independent of viscosity under flow conditions encountered in practice.

With reference to FIG. 2, cylindrical portion 62 of spool 60 has a diameter $D_1$ and a facial area $A_1$; cylindrical portion 61 has a diameter $D_2$ and a facial area $A_2$. The length of spool 60 is given by the dimension $L_1$, and the extreme separation between first output port 55 and second output port 57 is given by the dimension $L_2$.

It may be seen that spool length $L_1$ is sufficient to permit partial obstruction of output ports 55 and 57, but is insufficient to permit complete blockage of these ports.

When accumulator 3 is being charged, spool 60 is in equilibrium under the action of hydraulic and spring forces, and it is displaced an amount X from the edge of second output port 57. The forces acting on spool 60 are balanced according to the equation $A_1 P_1 + F = A_2 P_2$ where $F$ is the force of spring 64. Flows $Q_1$ and $Q_2$ are given by the equations $$Q_1 = \sqrt{K_1(P_s - P_1)}$$
$$Q_2 = \sqrt{K_2(P_s - P_2)}$$

where $K_1$ and $K_2$ are functions of second orifice 13 and first orifice 12, respectively, and are given by the equations $$K_1 = \frac{C_d^2 \pi^2 d_1^4}{8\rho}$$

and $$K_2 = \frac{C_d^2 \pi^2 d_2^4}{8\rho}$$

where $C_d$ is the discharge sufficient for the orifice under consideration, where $d_1$ and $d_2$ are the diameters of second orifice 13 and first orifice 12, respectively, and where $\rho$ is the mass density of the hydraulic fluid.

Because the power-steering pump flow $Q_s$ is constant at a given engine speed, and because it may be made approximately constant at all engine speeds by means of a flow regulator valve usually incorporated into power-steering pumps, it can be stated that $Q_1 + Q_2 = Q_s$.

The above equations may be used to obtain other mathematical relations between the various quantities.

The relationships between the pressures and flows in the system and the displacement X of spool 60 can be derived on the basis of the "orifice equation," which, as applied to each of variable orifices 70 and 72, is $$Q_1 = C_d a_1 \sqrt{2(P_1 - P_o)/\rho}$$

and $$Q_2 = C_d a_2 \sqrt{2(P_2 - P_o)/\rho}$$

where $P_o$ is the pressure at second output port 57 of flow control valve 15. Area $a_1$ is the area of variable orifice 70 and is equal to $D_1 X$; area $a_2$ is the area of variable orifice 71 and is equal to $D_2(L_2 - L_1 - X)$.

In view of the foregoing description of the invention and of the preferred embodiment thereof, what is claimed and desired to be protected by Letters Patent is:

1. A hydraulic power supply, which comprises:
   a. a positive displacement hydraulic pump;
   b. an accumulator for the storage of pressurized hydraulic fluid, said accumulator having a supply line;
   c. a check valve located in said accumulator supply line to prevent the escape of pressurized fluid therefrom;
   d. fluid flow dividing means connected to the output of said hydraulic pump, said dividing means having a first orifice and a second orifice connected in parallel with the first orifice to permit the output from said hydraulic pump to be divided therebetween;
   e. pressure-sensing valve means, responsive to the pressure in said accumulator, for blocking flow from said fluid flow dividing means first orifice when the pressure in said accumulator is above a first predetermined value and for permitting such flow when the pressure in said accumulator decreases below a second predetermined value and until such first predetermined value is reached, said pressure-sensing valve means having an input port connected to said fluid flow dividing means first orifice and an output port; and
   f. flow control valve means having a first input port connected to the output port of said pressure-sensing valve means and a second input port connected to said fluid flow dividing means second orifice and said flow control valve means having a first output port connected to said check valve in said accumulator supply line and a second output port for connection to a hydraulic system normally operating at low pressure, said flow control valve means being adapted, when said pressure-sensing valve means is opened to flow therethrough, to partially obstruct fluid flow into the hydraulic system normally operating at low pressure and, simultaneously with such obstruction, to allow fluid flow through said check valve and into said accumulator.

2. A hydraulic power supply in accordance with claim 1, wherein said flow control valve means comprises:
   1. a valve body having an opening therein, said flow control valve means first and second input ports and first and second output ports also being located within said valve body and communicating with said valve body opening;
   2. valve spool means movably mounted within said valve body opening for partially obstructing fluid flow from said flow control valve means first input port through said flow control valve means first output port and simultaneously for partially obstructing fluid flow from said flow control valve means second input port through said flow control valve means second output port; and
   3. resilient means for urging said valve spool means toward a position for substantially complete blockage of flow from said flow control valve means first input port through said flow control means first output port and toward a position for full flow from said flow control valve means second input port through said flow control valve means second output port.

3. A hydraulic power supply in accordance with claim 2, wherein said pressure-sensing valve means comprises:
   1. a valve body having an opening therein, said pressure-sensing valve means input and output ports communicating therewith, and said valve body having therein, and communicating with the opening, a pressure sensing port and an exhaust port;
   2. valve spool means movably mounted within said valve body for opening and closing flow from said pressure-sensing valve input port through said pressure-sensing valve output port, said valve spool means in operation being responsive to the pressure at the pressure-sensing port to produce a force on said valve spool means urging it to a position to close flow; and
   3. resilient means for urging said valve spool means toward a position to open flow from said pressure-sensing valve input port through said pressure-sensing valve output port.

4. A hydraulic power supply in accordance with claim 3, wherein said fluid flow dividing means comprises an orifice plate having a first and a second orifice therein located in the path of the output flow from said power-steering pump, in operation, to permit the flow from said power-steering pump to be divided between said orifices.

5. A hydraulic power supply in accordance with claim 1, wherein said pressure-sensing valve means comprises:
   1. a valve body having an opening therein, said pressure-sensing valve means input and output ports communicating therewith, and said valve body having therein, and communicating with the opening, a pressure-sensing port and an exhaust port;
   2. valve spool means movably mounted within said valve body for opening and closing flow from said pressure-sensing valve input port through said pressure sensing valve output port, said valve spool means in operation being responsive to the pressure at the pressure-sensing port to produce a force on said valve spool means urging it toward a position to close flow; and
   3. resilient means for urging said valve spool means toward a position to open flow from said pressure-sensing valve input port through said pressure-sensing valve output port.

6. A common hydraulic power supply for a power-steering system and a power brake system which comprises:
   a. a hydraulic pump of the positive displacement type;
   b. an accumulator for the storage of pressurized hydraulic fluid, said accumulator having a supply line;
   c. a check valve located in said accumulator supply line to prevent the escape of pressurized fluid therefrom;
   d. fluid flow dividing means connected to the output of said hydraulic pump, said dividing means having a first orifice and a second orifice connected in parallel with said first orifice to permit the output from said hydraulic pump to be divided therebetween;
   e. a pressure-sensing valve comprising a valve body having an opening therein and input, output, exhaust and pressure-sensing ports communicating with the opening, the opening being generally cylindrical in shape but larger in diameter at one portion than at another, the pressure-sensing port communicating with the opening at its larger diameter portion; an open center spool mounted for axial movement within said valve body opening, said open center spool having a large diameter cylindrical portion corresponding to the large diameter cylindrical portion of the opening and a small diameter cylindrical portion corresponding to the small diameter cylindrical opening, the small diameter portion being spaced from the large diameter portion of the spool to provide a central opening therebetween, said spool having a first position wherein said valve body output port is connected through said valve spool central region to said valve body exhaust port and wherein flow from said valve body input port to said valve body output port is blocked by said valve spool and wherein fluid entering said valve body through the pressure-sensing port exerts an axial force on the large diameter cylindrical portion of said valve spool to urge it toward its first position, and said valve spool having a second position wherein said valve body exhaust port is blocked and said valve body input port is open for flow therefrom through said valve body output port; and resilient means for urging said valve spool toward its second position; and f. a flow control valve comprising a valve body having an opening therein and first input and output ports and second input and output ports communicating with the opening, the opening having at least one cylindrical portion, said valve body first input port being connected to said pressure-sensing valve output port, said valve body first output port being connected to said check valve in said accumulator supply line, said valve body second input port being connected to said fluid flow dividing means second orifice, said valve body second output port being connected to the power-steering system; a valve spool having at least one cylindrical portion corresponding to that of said valve body opening, said valve spool being axially movable within said valve body opening, the length of said valve spool cylindrical portion being sufficiently small to prevent complete blockage of said valve body first and second output ports but sufficiently large to permit partial blockage of said valve body first and second output ports; and resilient means for urging said valve spool toward a position to block flow from said first input port through said first output port; and whereby said hydraulic pump may continuously supply hydraulic fluid to the power steering system, and whereby, when the pressure in said accumulator is above a first predetermined value, said valve spool of said pressure-sensing valve is in its first position to obstruct flow from said pressure-sensing valve output port so that substantially all of the output from said hydraulic pump flows through the power-steering system, and whereby, when the pressure in said accumulator decreases below a second predetermined value, said pressure-sensing valve spool is in its second position to permit flow from said pressure-sensing valve input port through said pressure-sensing valve output port to said flow control valve first input port and through said flow control valve first output port through said check valve and into said accumulator, until the pressure in said accumulator again reaches the first predetermined value.

* * * * *